United States Patent [19]

Lof

[11] 4,072,142

[45] Feb. 7, 1978

[54] HEAT ABSORBER FOR SOLAR ENERGY

[75] Inventor: George Lof, Englewood, Colo.

[73] Assignee: Solaron Corporation, Denver, Colo.

[21] Appl. No.: 609,230

[22] Filed: Sept. 2, 1975

[51] Int. Cl.² ............................................. F24J 3/02
[52] U.S. Cl. .................................. 126/270; 237/1 A
[58] Field of Search ................... 126/270, 271, 400; 237/1 A

[56] References Cited

U.S. PATENT DOCUMENTS

| 201,439 | 3/1878 | Moreau | 126/276 |
|---|---|---|---|
| 842,658 | 1/1907 | Haskell | 126/271 |
| 3,102,532 | 9/1963 | Shoemaker | 126/270 |
| 3,387,602 | 6/1968 | Thomason | 126/271 |
| 3,863,621 | 2/1975 | Schoenfelder | 126/270 |

*Primary Examiner*—Kenneth W. Sprague
*Attorney, Agent, or Firm*—Richard D. Law

[57] ABSTRACT

In a solar heat collector, a corrugated screen or a transverse series of perforated plates, on the underside of a heat absorber plate and heated by conduction and radiation from the absorber plate. The screen or perforated plates increase the surface area for heat transfer, especially to air, and produce turbulence of the heat transfer medium to increase heat transfer therefrom and also from the underside of the absorber plate. The screen or perforated plates are also adapted to support the heat absorber plate in a desired position.

3 Claims, 7 Drawing Figures

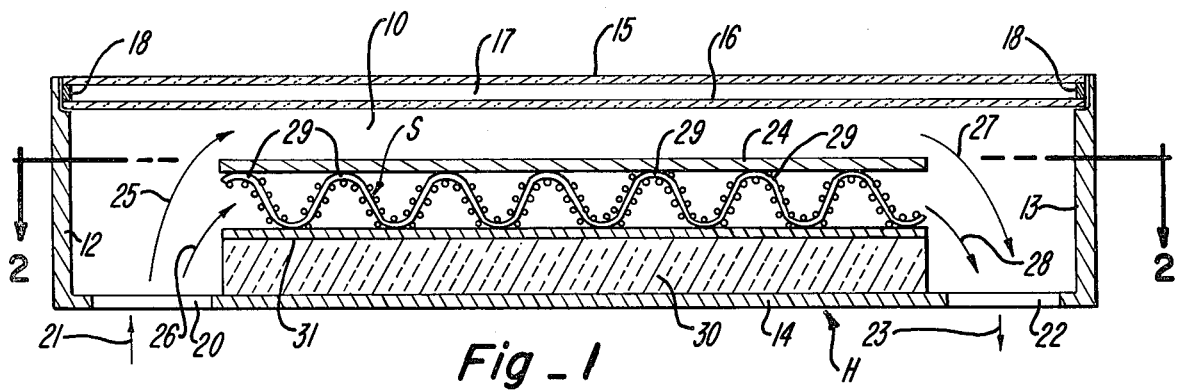
Fig_1
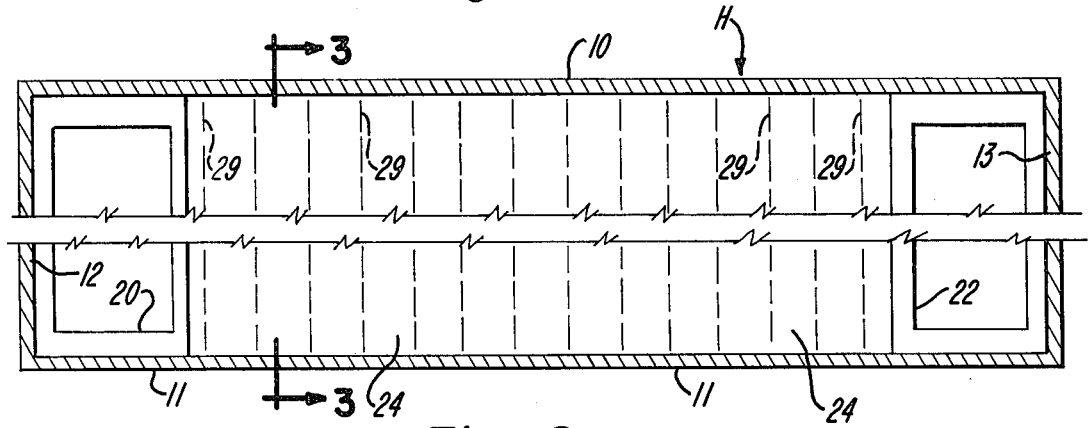
Fig_2
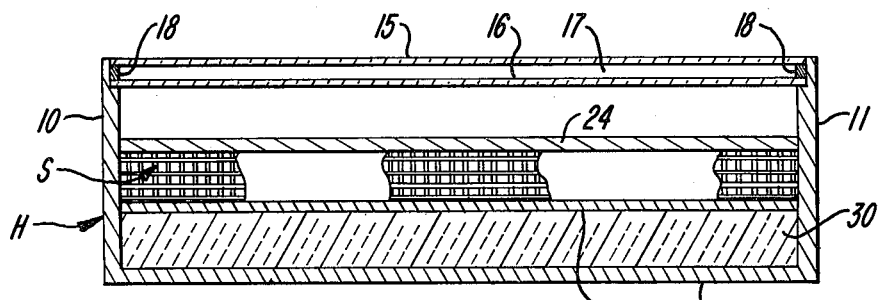
Fig_3
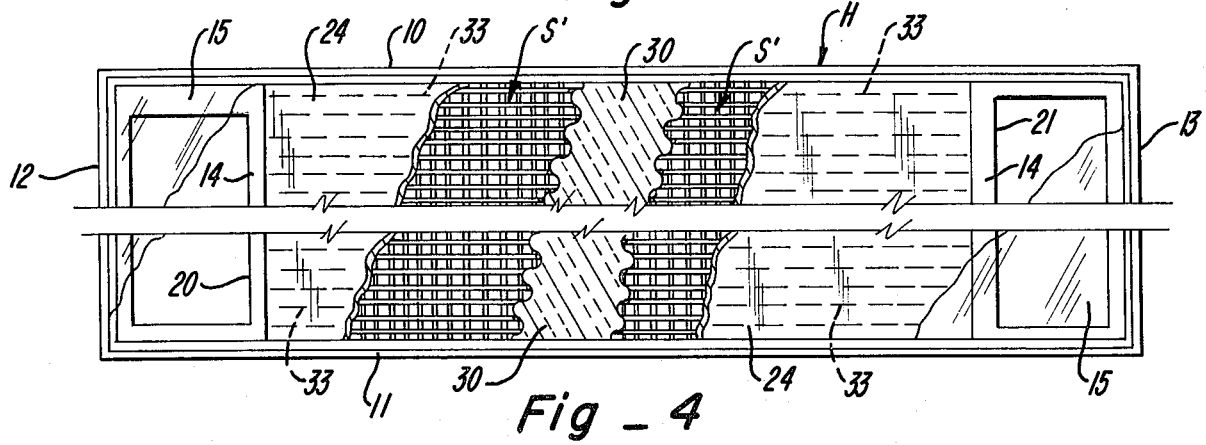
Fig_4

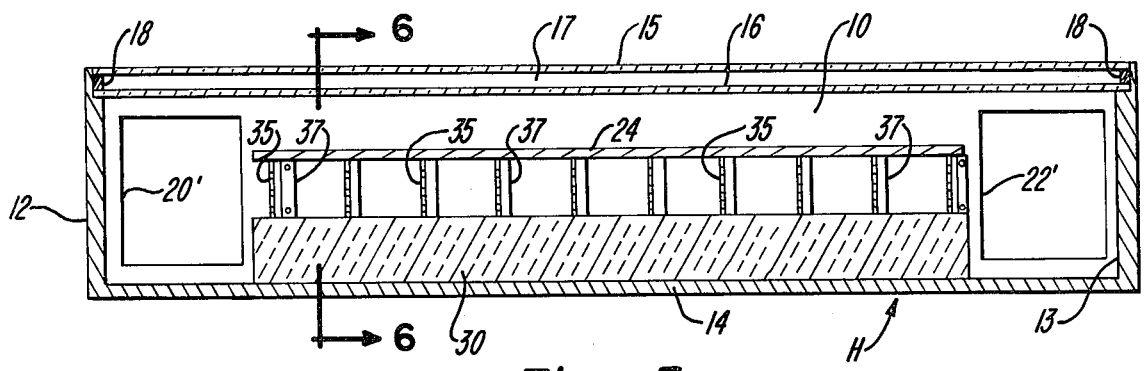
Fig _ 5
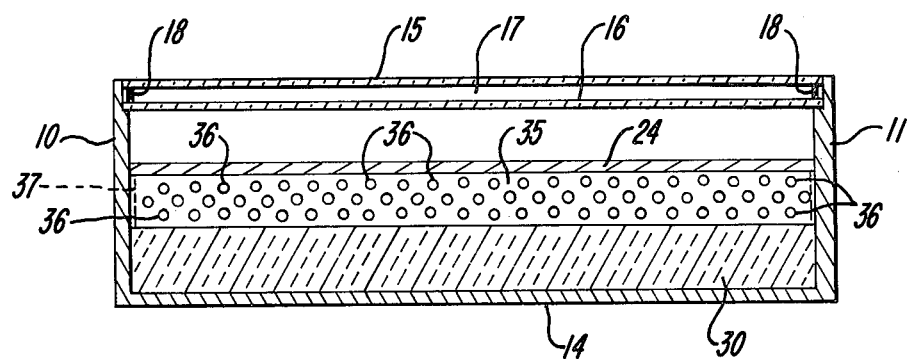
Fig _ 6
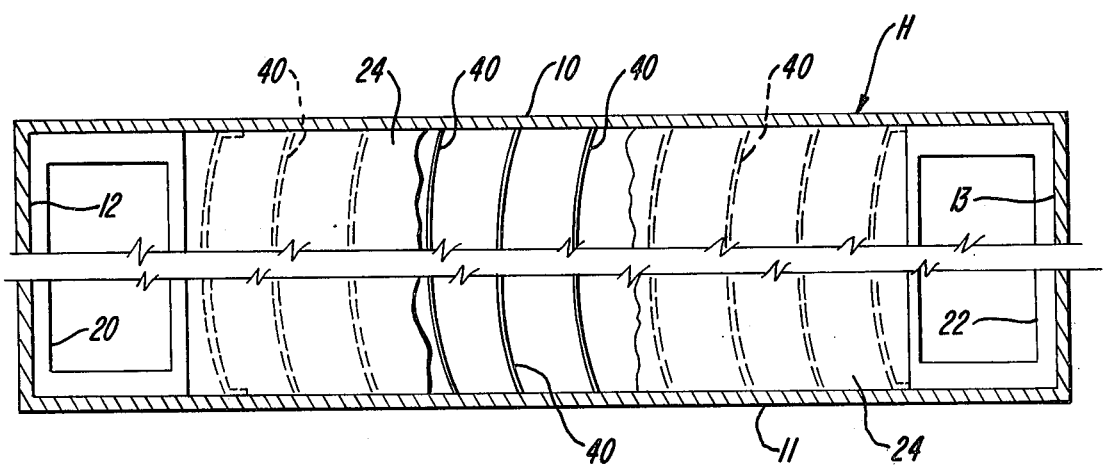
Fig _ 7

HEAT ABSORBER FOR SOLAR ENERGY

This invention relates to absorbers for solar radiation arranged to heat an air heat transfer medium, being related to my copending application Ser. No. 553,471 filed Feb. 27, 1975 for "Modular Construction for Solar Heat Collector" and copending application Ser. No. 553,472, filed Feb. 27, 1975, now abandoned, for "Solar Heat Absorber for Fluid Transfer Systems".

Many conventional solar heaters utilize a liquid or a gaseous heat transfer medium to transfer heat from a solar radiation absorber to a space to be heated or a heat storage unit. Gaseous systems have many advantages, as air is usually the transfer medium. Air is economical to move through inexpensive conveying duct work and is moved by relatively inexpensive blowers. Furthermore, it does not freeze and is inexpensive to replace. The overall air system is not required to be completely leak-proof, such as is required of liquid systems, while the materials of construction are most likely to be less expensive than those utilized in liquid systems and generally have a longer life.

A solar heater, using a fluid heat transfer medium, requires a collector for solar radiation and a transfer medium, such as air, to transfer the absorbed heat to use or a storage area. The collector is usually a closed housing having a cover which is transparent to solar radiation, and within the housing is a solar radiation absorber, usually a dull, black heat colector plate. The transfer medium is moved in a heat transfer relation with the absorber, either below or above the plate, or both, to pick up the heat absorbed and is then conveyed to use or a storage area. A number of housings may be placed side by side, receiving cool air from a common manifold and discharging heated air into a common manifold, or a portion of each housing, at opposite ends, may be utilized for the same purpose. In the usual installation, the heat absorbing assembly is mounted on the roof of a structure, such as a house, building or the like, and is mounted at a slope, so as to provide as large an absorption area as possible and preferably normal to the angle of solar radiation. As a mechanism to maintain the surface at exactly right angles to the solar radiation during all day and at all seasons is extremely expensive, such units are normally mounted at a slope which is a compromise between the high and low points of the sun at mid-day of the various seasons.

Among the objects of the present invention is to provide an improved solar heat absorber utiilizing air as the transfer medium.

Another object of the invention is to provide an improved solar absorber which provides an increased surface area for heating the air passing in contact therewith.

Another object of the invention is to provide an improved solar heat absorbing unit which is arranged for effective and efficient heat absorption from solar radiation and transfer of the absorbed heat through a transfer medium, such as air.

Another object of this invention is to provide a solar heat absorber by which heat loss is reduced through a greater area of surface to be contacted by the heat transfer medium, such as air.

Still another object of the invention is to provide an improved solar heat absorber having an auxiliary heat receiving member to which heat is conducted and/or radiated from the absorber for heat transfer to the air.

Another object of the invention is to provide an improved heat absorber having such an auxiliary heat receiving member which produces turbulence in the air, with a consequent increase in heat transfer from the absorber to the air and from the auxiliary member to the air.

Another object of the invention is to provide an improved solar heat absorber having an auxiliary heat receiving member which forms a support for the absorber plate.

According to the present invention, an effective and efficient heat absorber for solar heating systems using a fluid heat transfer medium includes a heat absorbing plate or the like, preferably painted black, and a foraminous means, such as a corrugated screen or a series of transverse, perforated plates, with the screen or plates being heated by conduction or also partly by radiation, from the absorber. The air, in passing through the screen or plates, absorbs heat from the screen or plates over a greater area, while the screen corrugations or plate perforations produce turbulence of the air, which increases the ability of the air to absorb heat from the surface of the absorber next to the screen or plates. The screen or plates are preferably formed of a material having a relatively high thermal conductivity, such as copper, although a screen or plates formed of other materials may be utilized. The screen or plates, as well as the underside of the absorber, may have a black surface to increase heat transfer to the air. The plane of the heat absorber plate is preferably disposed parallel to the heat transparent cover of the housing, with the corrugated screen or perforated plates on the opposite side from the cover.

The foregoing and other objects and the advantages of the invention will become apparent from the following description, taken in conjunction with the accompanying drawings, in which:

FIG. 1 is a central longitudinal section of a solar radiation, heat absorbing unit constructed in accordance with the present invention.

FIG. 2 is a condensed longitudinal section, taken along line 2—2 of FIG. 1.

FIG. 3 is a transverse section, taken along line 3—3 of FIG. 2.

FIG. 4 is a condensed top plan view, with portions of parts broken away to show the parts beneath and showing a modified form of heat absorbing unit also constructed in accordance with this invention.

FIG. 5 is a central longitudinal section, similar to FIG. 1 but showing another heat absorbing unit constructed in accordance with this invention.

FIG. 6 is a transverse section, taken along line 6—6 of FIG. 5.

FIG. 7 is a condensed longitudinal section, similar to FIG. 2 but showing a modified form of heat absorbing unit constructed in accordance with this invention.

In the heat absorber illustrated in FIGS. 1–3, a housing H includes parallel side walls 10 and 11, parallel end walls 12 and 13 and a bottom wall 14. The top of the housing H is closed by a top cover 15, which may be glass, plastic or the like, for the passage of solar radiation and the absorption of thermal energy within the housing. This is the so-called "greenhouse" effect. Normally, an inner cover 16, which likewise may be glass, plastic or the like and transparent to the major components of solar radiation impinging thereon, provides a generally closed air space 17, between the outer cover 15 and inner cover 16, which provides an insulating effect but across which the solar radiation may readily pass. Top cover 15 and inner cover 16 may be spaced apart by bars 18, or supported in any suitable manner, as by longitudinal slots in the side walls, as in my aforesaid application Ser. No. 553,471. Air to be heated may be passed through a housing inlet 20 in the direction of an arrow 21, while the heated air may be discharged through an outlet 22 in the direction of an arrow 22. Disposed beneath the inner cover 16 and spaced therefrom is a heat absorber 24 formed from a metal plate or the like, to provide a surface which is parallel to the inner cover 16, while air may flow from inlet 20 to the passage above the plate 24, as indicated by arrow 25, or below plate 24, as indicated by arrow 26. At the exit end, air may flow through outlet 22 from above plate 24, as indicated by arrow 27, or from below plate 24, as indicated by arrow 28.

In accordance with this invention, a screen S having transverse corrugations, as shown, is disposed below plate 24. The corrugations of the screen engage the underside of plate 24 along spaced lines 29 at spaced intervals, and may be attached to the plate, as by tack welding or the like, at points along lines 29. The underside of plate 24 may be blackened for better radiation of heat to the screen. The flow of air through the interstices of the screen produces a comparatively high rate of heat transfer to the air from the screen, while the corrugations of the screen, which may follow essentially a sine wave or have any other desired configuration, produce a turbulence in the air flow which assists in heat transfer, particularly from the underside of plate 24.

A block 30 of insulation, resting on housing bottom 14 and extending between the sidewalls 10 and 11, resists the loss of heat by conduction or radiation from the bottom of the heat absorber plate. Block 30 also supports screen S which, in turn, supports heat absorber plate 24. The insulation 30 may be of any suitable type, such as a rigid plastic foam. A black surfaced plate 31 may also be interposed between the screen S and the insulation 30, in order to absorb from the lower surface into the air of the absorber plate 24 and provide additional heat transfer surface for heating air passing in contact therewith. The heat absorber plate 24 may extend to the end walls 12 and 13 and be provided with a rectangular slot positioned above the inlet 20, as well as a rectangular slot positioned above the outlet 22. Or, heat absorber plate 24 may extend to the end walls, but without apertures, so that air will flow only beneath the plate, along the path of arrows 26 and 28.

A series of housings H may be connected together in laterally abutting relation, with the inlet and outlet openings in the opposite sides of the housing, rather than the bottom, so that cool or unheated air may flow through each inlet opening in wall 10, with part following the arrows of FIG. 1 and the remainder flowing across the inside of the housing and through a corresponding but opposite opening in wall 11 which feeds into the inlet opening of the next housing. Suitable air directing baffles may be placed in the inlet portions of the respective housings, in order to produce equalized flow through the respective housings. In this way, a series of housings may be fed with unheated air without requiring the handling or use of unduly wide sheets of glass and the like. Thus, each housing H may be on the order of 8 feet in length and 2 feet in width.

The heated air which flows through outlet 22, may, in an assembly of laterally abutting housings, instead flow through an outlet in one side of the housing into a corresponding but opposite opening in the next adjacent housing, each, in turn, to mingle with the heated air produced by other heat absorbers and flow on through the tops of the housings to include additional heated air until discharged. It will be understood, of course, that separate manifolds may be used to transfer unheated air to the housings and to transfer heated air away from the housings. The heated air is led in a conventional manner to the point of use, such as areas to be heated or to a conventional heat storage system.

The modified solar heat absorber illustrated in FIG. 4 includes a screen S' having longitudinal corrugations and contacting the underside of absorber plate 24 along longitudinal lines 33, thereby forming longitudinal channels both above and below the screen. As before, the screen forms a support for the absorber plate 24 and also may be attached, as by tack or spot welding, or connected, as by brazing, to the underside of plate 24 at points along contact lines 33. The longitudinal corrugations of screen S' do not provide as much resistance to air flow as the transverse channels of screen S, but screen S' does provide considerable additional area for heat transfer to the heat transfer medium, such as air.

The modfied solar heat absorber illustrated in FIG. 5 and 6 is installed within a housing H, as before, with a transparent top cover 15 and a transparent inner cover 16 above a heat absorber plate 24 disposed in spaced relation to a block 30 of insulation. In accordance with this invention, a series of baffles or plates 35 depend from the absorber plate 24 to support the absorber plate, with the upper ends thereof being attached to the absorber plate, as by brazing, to increase the conduction of heat from absorber plate 24 to baffle plate 35. As before, the underside of the absorber plate may be black, while the baffle plates 35 may also be black. Each series of baffle plates is provided with holes 36 which may be spaced horizontally or vertically, as in FIG. 6, in adjacent baffle plates, so that some turbulence is produced in the air passing through the holes which increases the transfer of heat to the air from the plates and also from the underside of the absorber plate 24. Selected baffle plates 35 may be provided with end flanges 37, to provide additional support. Since the weight of the absorber plate 24 is not great, the baffle plates 35 can be relatively thin. The baffle plates 35 may also be disposed angularly in a longitudinal direction. Otherwise, the embodiment shown in FIG. 5 operates in a manner similar to that described in connection with FIGS. 1–3, with similar parts having the same reference numerals, except that the inlet openings 20' and the outlet openings 22' are shown in the side walls 10 and 11, so that a series of heat absorbers may be placed side by side, with the inlet openings in line and the outlet openings also in line.

The alternative embodiment illustrated in FIG. 7, includes a housing H and parts having the same reference numerals similar to those of FIGS. 1–4 and FIG. 5. The exception is the baffle plates 40 which are attached to and depend from the plate 24, but are curved in a transverse direction, so as to form generally parallel plates having holes or perforations similar to the holes 36 of FIG. 6. The curvature of the plates 40 decreases the tendency to buckle and thus increase the weight which the plates can support, so that plates 40 may be made quite thin but will support the absorber plate 24 without buckling.

Although several preferred embodiments of this invention have been illustrated and described, it will be understood that other embodiments may exist and and that various changes may be made, all without departing from the spirit and scope of this invention.

What is claimed is:

1. In a solar heat collector:

a housing having a cover transparent to solar radiant energy;

a heat absorbing and radiating plate disposed in generally parallel spaced relation to said cover;

foraminous means attached to the underside of said heat absorbing plate in heat conductive and supporting relationship; and insulation means disposed beneath said absorber plate and said foraminous means for supporting said absorber plate and said foraminous means; and means for guiding a gas to be heated into engagement with the top surface of said heat absorbing plate and into turbulent engagement with the bottom surface of said absorbing plate and with said foraminous means, for conducting heat from said absorbing plate to said gas.

2. In a solar heat collector as defined in claim 1, wherein:

said foraminous means comprises a corrugated screen.

3. In a solar heat collector as defined in claim 1, wherein:

said foraminous means comprises a series of perforated plates beneath said absorber plate.

* * * * *